United States Patent Office 3,567,668
Patented Mar. 2, 1971

---

3,567,668
METHOD FOR PREPARING AND COMPOSITIONS OF EPOXY RESIN ESTERS PRECONDENSED WITH PHENOPLASTIC OR AMINOPLASTIC RESINS
Rolf Güldenpfennig, Dossenheim, Germany, assignor to Reichhold Chemie Aktiengesellschaft, Hamburg, Germany
No Drawing. Filed Feb. 13, 1968, Ser. No. 705,008
Claims priority, application Germany, Feb. 24, 1967,
R 45,371
Int. Cl. C08g 45/08, 45/10
U.S. Cl. 260—19
13 Claims

ABSTRACT OF THE DISCLOSURE

Water-dilutable, heat-curable coating compositions prepared by:

(I) forming partial esters of compounds containing epoxy groups or hydroxyl groups by hydrolytic dissociation of the epoxy groups with adducts of maleic acid with fatty acids or maleic anhydride with fatty acids, the fatty acids consisting of drying oil acids, semi-drying oil acids and mixtures of the oil acids with rosin acids, the fatty acids containing unsaturated monocarboxylic acids, the molar proportion of monocarboxylic acid to maleic acid or maleic anhydride being between about 0.9:1 and 1.1:1, the compounds containing epoxy groups consisting of epoxy resins having molecular weights of about 380 to 3500;

(II) precondensing by heating to 160° C. about 99 to 50 percent by weight of the partial esters with about 1 to 50 percent by weight of heat-curable, water-dilutable low molecular weight condensation products of phenoplast resins, aminoplast resins or mixtures thereof;

(III) neutralizing the precondensed product with a basic material; and (IV) diluting the neutralized product with water;

in a particular embodiment the steps of the process are varied wherein the epoxy resins are first precondensed with the phenoplast or aminoplast resins and then the epoxy groups of the epoxy resins are reacted with the adducts of maleic acid and maleic anhydride.

CROSS-REFERENCES TO RELATED APPLICATIONS

Applicant claims priority under 35 U.S.C. 119 for application R 45,371 IVc/22g, filed in the Patent Office of the Federal Republic of Germany on Feb. 24, 1967.

Applicant incorporates by reference his copending U.S. applications Ser. No. 661,558, filed Aug. 18, 1967, entitled "Water-Dilutable Coating Compositions Containing Etherified Phenol Resols"; Ser. No. 666,453 filed Sept. 8, 1967, entitled "Water-Dilutable Coating Compositions Containing Precondensates of Phenol Resols and Etherified Phenol Resols With Epoxy Resin Partial Esters"; and Ser. No. 532,866 filed Mar. 7, 1966, entitled "Water-Dilutable Compositions and Lacquer Binders."

BACKGROUND OF THE INVENTION

The field of the invention is coating compositions containing fat, fatty oil, fatty oil acid or salts thereof.

The state of the prior art is set forth in Kirk-Othmer, Encyclopedia of Chemical Technology, 2nd edition, volume 1 (1963), "Alkyd Resins," pages 851–882; volume 8 (1965) "Electrophoretic Deposition," pages 23–36; and volume 8, "Epoxy Resins," pages 294–312, particularly pages 304–309 which disclose epoxy esters and their utility in protective coatings.

Coating compositions and lacquer binders as binders, especially for primers. The water-soluble compositions and lacquer binders of the present invention, however, are not known to the prior art. The new coating compositions and lacquer binders, based on epoxy ester resins combined with phenolic resins and/or melamine resins are made water-soluble and hence combine the advantages of the two types of binders.

SUMMARY OF THE INVENTION

Having in mind the limitations of the prior art epoxy resin esters wherein organic solvents were required for application, it is an object of the present invention to provide coating compositions and lacquer binders containing epoxy resin esters which are diluted with water.

It is a further object to provide a coating composition having application in usual methods and in particular in electrophoretic deposition.

Other objects of the invention are to provide an improved electrophoretic coating process with the compositions of the present invention.

A particular object of the present invention is to provide a composition as disclosed in U.S. patent application Serial No. 532,866 with improved storage stability.

On further study of the specification and claims, other objects and advantages of the present invention will become apparent.

The coating compositions according to the present invention which are capable of dilution with water are intended to be used in aqueous or predominantly aqueous solution and are prepared by:

(I) Forming partial esters of compounds containing epoxy groups or hydroxyl groups by hydrolytic dissociation of the epoxy groups with adducts of maleic acid with fatty acids or maleic anhydride with fatty acids, the fatty acids consisting of drying oil acids, semi-drying oil acids and mixtures of the oil acids with rosin acids, the fatty acids containing unsaturated monocarboxylic acids, the molar proportion of monocarboxylic acid to maleic acid or maleic anhydride being between about 0.9:1 and 1.1:1, the compounds containing epoxy groups consisting of epoxy resins having molecular weights of about 380 to 3500;

(II) Precondensing by heating to 160° C. about 99 to 50 percent by weight of the partial esters with about 1 to 50 percent by weight of heat-curable, water-dilutable low molecular weight condensation products of phenoplast resins, aminoplast resins or mixtures thereof;

(III) Neutralizing the precondensed product with a basic material; and (IV) Diluting the neutralized product with water; in a particular embodiment the steps of the process are varied wherein the epoxy resins are first precondensed with the phenoplast or aminoplast resins and then the epoxy groups of the epoxy resins are reacted with the adducts of maleic acid and maleic anhydride.

The coating compositions of the present invention find particular utility either alone or mixed with pigments and/or fillers in primer, single layer coatings or top coatings.

The plasticized resins disclosed in application Ser. No. 532,866, which contain free carboxyl groups are suitable as the plasticizing epoxy resin partial esters.

The heat-curable hydrophilic low molecular condensation products disclosed in application Ser. No. 532,866, especially the phenolic-resols, in the form of phenol-alcohols, phenol-polyalcohols or resols of phenol-carboxylic acids, are suitable as the phenoplast resins of the present invention. As the phenoplast resins it is also possible to use, additionally to, or in place of, the phenolic-resols, phenolic-resols or phenolcarboxylic acid resols etherified with lower monohydric aliphatic alcohols having 1–4 carbon atoms, such as methanol, ethanol, propanol or butanol, preferably methanol, and especially alkyl-phenolic-resols. Furthermore, however, the condensation products forming aminoplastic resins mentioned in application Ser. No. 532,866 are also usable as the aminoplast resins.

The combination of the epoxide resin partial esters with etherified phenolic-resols or condensation products forming aminoplastic resins by bringing them together with warming offers the advantage of achieving somewhat higher storage stability of the aqueous coating compositions, and also of yielding an improvement in the corrosion resistance of the stoved films. As phenolic-resols, the phenolic-resols and phenol-carboxylic acid resols mentioned in application Ser. No. 532,866, are preferably p.tert.-butylphenol-resols, may be used for the etherification and may be present as the phenoplast resins in the coating composition. The degree of etherification and the proportion of etherified phenolic-resols in the coating compositions according to the invention is so selected that homogeneous films result after stoving. The ratios of the amounts of epoxide resin partial ester and heat-curable condensation products lie, especially in the case of etherified phenolic-resols, in the coating compositions according to the invention, between 1–50% by weight, and the preferred range is 5–35% by weight, in each case relative to solid resin.

The combination may take place by methods which are in themselves known, by heating to temperatures of about 80 to 160° C. It is particularly advantageous to carry out the combination in vacuo, since hereby the excess water of reaction can be removed particularly rapidly. The ratios of the amounts of epoxide resin partial ester and heat-curable condensation products for the combination with warming lie, especially with phenolic-resols, between 1–50% by weight, and the preferred range is 5–35% by weight. The time required for the combination and the temperature are followed through the viscosity increase. In the case of electrophoresis resins the viscosity, measured at 50% strength in butylglycol, should lie within the range B–Q (Gardner-Holdt viscometer). The best results are obtained if the viscosity falls within the range C–K (0.85–2.75 stokes/25° C.). The preferred acid number range for the resins combined with warming is about 60–100. The heating time and combination temperature and the proportion of the phenolic-resols combined with warming in the coating compositions according to the invention is so selected that after stoving homogeneous films with the desired advantageous properties are obtained.

In a further embodiment, the characterized mixture of the plasticizing epoxy resin partial esters with the aminoplast resins, combined with warming, may after attaining the desired conversion be additionally combined with warming, at about 80 to 120° C. The aminoplast resins have been described in application Ser. No. 532,866.

In a further embodiment of the process, it has been found that the sequence of the reaction may be varied. Thus, the precondensation of the aminoplast or phenoplast resins need not necessarily take place with the plasticizing epoxy resin partial esters but can also be carried out directly with the epoxide resins. All that is required for this is that the esterification with polycarboxylic acids or polycarboxylic acid anhydrides which follows the precondensation is carried out at temperatures which are at least not significantly above the temperature ranges required for the precondensation. The temperature for the precondensation reaction is in this case about 80 to 160° C., with the reaction temperature depending on the reactivity of the components. The polycarboxylic acids should be chosen accordingly. In particular, the "tricarboxylic acids" which cannot be precisely defined and which are obtained by addition of maleic anhydride to unsaturated fatty acids in a known manner, are suitable.

A variant of the coating compositions is characterized in that the resulting precondensates have been obtained by precondensation of phenoplasts or aminoplasts with the monocarboxylic acid-epoxide resin partial esters or with the epoxide resins.

Another variant of the coating compositions is characterized in that the resulting precondensates are obtained by precondensation of the phenoplast resins with the monocarboxylic acid-epoxide resin partial esters or with the epoxide resins.

For using the products as electrophoretic-binders, the viscosity of the precondensed epoxide resin partial esters containing free carboxyl groups, measured at 50% strength in butylglycol, should be in the range of 100–500 cp., especially 150–250 cp./20° C. The acid number should preferably be 60–100. Butylglycol may be added to the resin in order to increase the amount of coating which can be deposited.

The stoving lacquers themselves may be manufactured by mixing their components in the usual manner. It is generally appropriate to mix the water-soluble salts of ammonia or amines or mixtures of ammonia and amines and synthetic resins of components A and B with the other components in the form of concentrated aqueous solutions which may optionally contain minor quantities of water-soluble organic solvents, and then if necessary to adjust the concentration and the pH value of the mixed solutions to the desired values. The pH value of the desired solution should generally appropriately be about 7.5–9.0, especially about 8; if necessary, it may be readjusted with ammonia or organic strong nitrogen bases after the resins have been stored for a longer period.

The stoving lacquers may contain the appropriate usual additives, for example minor quantities of water-soluble organic solvents, in whose presence the components of the stoving lacquer have been manufactured, and/or other solvents such as monoalkyl ethers of diethylene glycol and triethylene glycol, and furthermore compounds of hexavalent chromium, such as ammonium dichromate, as well as soluble dyestuffs, pigments, materials for improving levelling, corrosion protection agents, stabilizers and/or cure catalysts.

The stoving lacquers may be applied to the articles to be lacquered by employing the usual methods; the stoving lacquers are above all suitable for the lacquering of sheet metal. Herein it is a particular advantage of the lacquers that they can also be deposited on the sheet metal by the electrophoresis process. The stoving of the lacquers may take place at temperatures of about 80 to 180, preferably from about 140 to 180° C., and over a period of about 10 to 80, preferably about 20 to 60, minutes depending on the stoving temperature.

The stoving lacquers according to the invention may be used unpigmented or pigmented and/or containing fillers. They may, for example, be applied to iron or steel, or non-ferrous metals, with or without pre-treatment such as passivation, phosphatization, electrochemical treatment, galvanizing, tin-plating or other metallizing.

Pigments and/or fillers are for example, without thereby limiting the invention, red iron oxide, carbon black, lead silicochromate, strontium chromate, blanc fixe, micronized varieties of baryte, micro-talc, colloidal chalk, diatomaceous earth, china clay, titanium dioxide, green chromium oxide and others. As regards the use of suitable types of titanium dioxide, attention is drawn to F. Holzinger, Deutsche Farbenzeitschrift (German Colour Journal), volume 19, page 401 (1965). As regards the selection of colour pigments, see the article by E. H. Ott and B. Dreher, Schweizer Archiv für angewandte Wissenschaft und Technik (Swiss Archives for Applied Science and Technology), volume 31, issue 6, page 189 (1965).

The use of strongly basic pigments such as zinc oxide, zinc chromate, lead carbonate, basic lead sulphate, red lead or calcium plumbate requires exact testing. These pigments may tend to thicken or precipitate. The ratio of pigment to binder depends on the type of pigment employed and on the end use envisaged. In the case of such as a stoving lacquer which can be electrophoretically deposited, a pigment to binder ratio of between 0.1 to 1 and 0.8 to 1 is used. A ratio of 0.6 to 1 to 2 to 1 is usually chosen for the usual methods of employing the coating material, such as spraying, dipping, flooding and the like.

DESCRIPTION OF THE PREFERRED EMBODIMENTS

By water-dilutable coating compositions are meant products which are soluble or dispersible in water alone or at least with the addition of a minor amount of an organic solvent that is largely or completely miscible with water, such as mono- and di-ether of ethylene glycol or diethylene glycol with low monovalent alcohols such as methanol, ethanol, propanol or butanol, as for example methyl glycol, ethylene glycol, propylene glycol, isopropyl glycol, butyl glycol, diethyl glycol diethyl ether, also diacetone alcohol, low ketones such as acetone, methyl ethyl ketone, methyl isobutyl ketone, colloidal solutions being preferred.

As compounds containing epoxy groups or possibly hy-

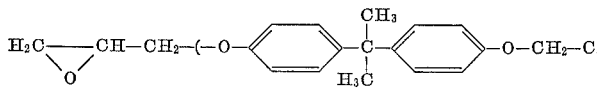

droxyl groups, the following may be considered: epoxidized olefins, diolefins and oligo-olefins, such as 1,2,5,6-dioxy hexane and 1,2,4,5-diepoxy hexane, epoxidized, olefinically or diolefinically unsaturated carboxylic acid esters with mono or polyvalent alcohols, for example diepoxy stearic acid ester or monoepoxy stearic esters of the methanol, ethanol, propanol and butanol including their isomers, bis-(diepoxystearic acid)- and/or bis-(mono-epoxystearic acid)-ester of polyvalent alcohols, as for example ethylene glycol, 1,2- or 1,3-propylene glycol, 1,2-2,3-, 1,4-butylene glycol, neopentyl glycol, 1,6-hexandiol, glycerol, trimethylol propane, trimethylol ethane, pentaerythrite; tri-(diepoxy stearic acid)- and/or tri-(mono epoxy stearic acid)-ester of glycerol, trimethylol propane, trimethylol ethane or pentaerythrite, tetra-(diepoxy stearic acid)- and/or tetra-(mono epoxy stearic acid)-ester of pentaerythrite.

Furthermore, the following should be considered: epoxidized unsaturated oils such as soybean oil, safflower oil, dehydrated castor oil alone or in a mixture, epoxidized compounds with several cyclohexenyl remainders, such as diethylene glycol-bis-(3,4-epoxy-cyclohexane, carboxylate) and 3,4 - epoxy-cyclohexyl methyl-3,4-epoxy-cyclic-hexane carboxylate and vinyl-cyclo-hexane-dioxide.

Especially suitable are polyesters with epoxy groups, such polyesters being produced by reacting a dicarboxylic acid with epihalogen hydrin or dihalogen hydrin, such as epichlorhydrin, dichlorhydrin or the like in the presence of alkali. Such polyesters can be derived from aliphatic dicarboxylic acids, such as oxalic acid, amber acid, glutaric acid, adipic acid, pimelic acid, suberic acid, azelaic acid, sebacic acid, or from aromatic dicarboxylic acids such as phthalic acid, isophthalic acid, terephthalic acid, 2,6-naphthylene-dicarboxylic acid, diphenyl-o, o'-dicarboxylic acid and ethylene glycol-bis-(p-carboxyl phenyl)-ether, which are applied alone or in a mixture. They correspond essentially to the formula:

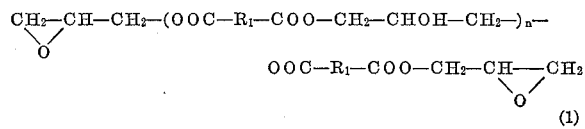
(1)

$R_1$ representing an aliphatic or aromatic group and $n=0$ or a small number. Compounds of the above formula whose molecular weight does not surpass 3,000, are well suited. Those with molecular weights of between 500 and 100 are preferred.

Best suited are polyethers with epoxy groups such as those obtained by esterification of a bivalent alcohol or diphenol with epihalogen hydrin or dihalogen hydrines, e.g. with epichlorhydrin or dichlorhydrin in the presence of alkali. These compounds may be derived from glycols such as ethylene glycol, diethylene glycol, triethylene glycol, propylene glycol-1,2, propylene glycol-1,3, butylene glycol-1,4, pentandiol-1,5, hexandiol-1,6 and especially from diphenols such as resorcine, pyrocatechine, hydrochinone, 1,4-dihydroxy naphthalene, bis-(4-hydroxy phenyl)-methane, bis-(4-hydroxy phenyl)-methyl phenyl methane, bis-(4-hydroxy phenyl) tolyl methane, 4,4'-dihydroxy diphenyl and 2,2'-bis-(4-hydroxy phenyl)-propane.

The polyethers containing epoxy groups have the following general formula:

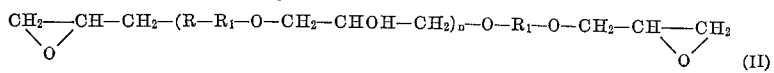 (II)

$R_1$ representing an aliphatic or aromatic group and $n=0$ or a small number.

To be emphasized specially are epoxy group containing polyethers of the general formula:

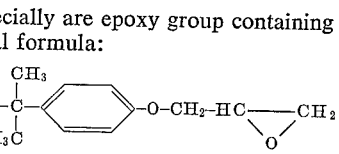

which contain 2,2-bis-(4-hydroxy phenyl)-propane as initial compound; of which preferably polyethers with molecular weights of between about 380 and 3500 are employed.

For electrophoretically precipitable coating compounds, those polyethers with molecular weights of about 380 to 900 are suitable. Those with higher molecular weights are also suitable, and provide corrosion resistant films, but it is more difficult to obtain thicker layers of them. For water-dilutable coating compositions which are applied by customary methods, such as dipping, spraying flooding, pouring or spreading, polyethers with higher molecular weights are preferred.

Furthermore, those polyglycidyl ethers derived from tri- and polyhydroxyl compounds can also be used, by which ethers with two or more glycidyl remainders should be understood. Such may be trimethylol propane triglycidyl ether, trimethylol ethane triglycidyl ether, glycerol triglycidyl ether, pentaerythrite triglycidyl ether, pentaerythrite tetraglycidyl ether, pentaerythrite tetraglycidyl ether or polyglycidyl ether of esters of polyvalent alcohols with hydroxy acids, such as di- or triglycidyl ether of the triricinoleates or of castor oil respectively.

Among the polyglycidyl ethers, those which are obtained in a known manner (German Patents 1,184,496 and 1,138,542) by the reaction of lacquers on the basis of phenol, cresol, xylenol, or bisphenols with epichlorhydrin are well suited. Other epoxides and/or epoxy resins with epoxy groups or epoxy groups and hydroxyl groups and with molecular weights of up to about 3000 have been described in large numbers in the book "Epoxydverbindungen und Epoxyharze" by A. M. Paquin, Springer-Verlag (1958), Berlin, Gottingen, Heidelberg.

It should be mentioned that the compounds mentioned can usually also be used when the epoxy groups have already di- or poly-hydroxyl compounds present.

As monobasic carboxylic acids, aromatic and/or hydro-aromatic and/or heterocyclic and/or aliphatically straight chained and/or ramified chained, unsaturated and/or saturated monocarboxylic acids are suitable. Importance should be given primarily to the saturated and/or unsaturated monocarboxylic acids.

As monobasic aliphatic carboxylic acids, the following are suitable: straight and/or ramified chained, saturated and/or unsaturated fatty acids with 1 to 40 carbon atoms, such as acetic acid, propionic acid, butyric acid, valerianic acid, capronic acid, caprylic acid, capronic acid, iso-octanic acid, nonanic acid, isononanic acid, undecanic acid, lauric acid, myristic acid, palmitic acid, palmitoleinic acid, petroselinic acid, stearic acid, oleic acid, eleaidic acid, 9,12-linoleic acid, 9,11-linoleic acid (in the cis, cis-trans and trans-trans form), linoleic acid, elaeostearic acid, arachic acid, behenic acid, lignocerinic acid, euruca acid, arachidonic acid, clupanodonic acid, α-parinaric acid, α-licanic acid, or their anhydrides respectively, alone or in a mixture. Preferred fatty acid mixtures are those obtained from natural vegetable and animal fats such as cotton seed oil, peanut oil, wood oil, maize oil, oiticica oil, olive oil, poppy seed oil, boleko oil, palm oil, palm nut oil, olive seed oil, perilla oil, colza oil, coconut oil, sunflower oil, walnut oil, grapeseed oil, sardine oil, herring oil, menhaden oil, trane oil, lard or beef suet, and especially linseed oil, soy bean oil, coconut oil, and safflower oil. Furthermore technical fatty acids may be used, especially tall oil fatty acids, chemically treated fatty acids or fatty acids from chemically treated fats, especially dehydrated castor oil fatty acids or fatty acids conjugated by catalytic processes. Fatty acids from catalytically conjugated fats, especially conjugated linseed oil, soy bean oil or safflower oil fatty acids, fatty acids elaidinated by catalytic processes or fatty acids from elaidinated fats, hydrated or partially hydrated fatty acids or fatty acids from hydrated and/or partially hydrated fats, e.g. fish oils as well as rosin acids, especially colophony and/or hydrated and/or partially hydrated rosin acids, especially hydrated and/or partially hydrated colophony or mixtures of such acids or acid mixtures of the above-named type with each other.

By monobasic carboxylic acids there should also be understood partial esters of polybasic carboxylic acids which contain one free carboxyl group only, such as mono esters of amber acid, glutaric acid, adipic acid, pimelic acid, suberic acid, azelaic acid, sebacic acid, especially partial esters of dimerized or oligomerized unsaturated fatty acids and/or partial esters of such "tricarboxylic acids" not exactly definable, which result from adduct formation of α,β-unsataurated dicarboxylic acids or their anhydrides respectively to unsaturated fatty acids, as described in greater detail below, with preferably straight chained saturated aliphatic alcohols with 1 to 20 carbon atoms, such as methanol, ethanol, propanol, especially butanol, pentanol, hexanol and the like, whereby methanol is preferred.

Bakeable coating compounds with excellent properties are obtained when phenol carboxylic acids condensable with formaldehyde are used alone or in a mixture with the previously named as monobasic carboxylic acids. Among these, 4,4-bis-(4-hydroxy phenyl)-valeric acid has a special significance.

Furthermore, it has been found that instead of monobasic carboxylic acids, which are bonded to the epoxy resin by esterificaton, compounds containing monohydroxyl groups can be inserted by etherification, in the proportion in which epoxy groups are contained in the epoxy resin, i.e. one hydroxyl group can be bonded per epoxy group. As compounds containing hydroxyl groups, rosin alcohol and especially higher fatty alcohols are suitable, such as lauryl alcohol, myristyl alcohol, palmityl alcohol, stearyl alcohol, but also esters of hydroxy fatty acids, such as ricinoleic acid ester, hydroxy stearic acid ester.

As polybasic carboxylic acids, the following are suitable alone or in mixtures: di-, tri- and polycarboxylic esters, e.g. oxalic acid, amber acids, glutaric acids, adipic acid, pimelic acid, suberic acid, azelaic acid, sebacic acid, maleic acid, fumaric acid, citraconic acid, mesaconic acid, itaconic acid, phthalic acid, isophthalic acid, terephthalic acid, tetra and hexahydrophthalic acid, trimellithic acid, pyromellitic acid, or their anhydrides if they exist.

Among the dicarboxylic acids, the polybasic acids obtained by dimerization or oligomerization of unsaturated fatty acids should be mentioned. Preferably converted are the "tricarboxylic acids" not exactly to be defined, those formed by addition of α,β-unsaturated dicarboxylic acids or their anhydrides respectively, if they can be formed, such as maleic acid, fumaric acid, mesaconic acid, citraconic acid, itaconic acid or their possible anhydrides, among which maleic acid anhydride is preferred to unsaturated fatty acids such as palmitoleinic acid, petroselinic acid, oleic acid, elaidinic acid, cis-cis, cis-trans or trans - trans - 9,12 - linoleic acid, cis-cis, cis-trans or trans-trans-9,12-linoleic acid, linoleic acid with isolated and conjugated double bonds, elaeostearic acid, euruca acid, clupanodonic acid, licanic acid, parinaric acid alone or in a mixture. Use is made especially of mixtures of unsaturated fatty acids obtained from natural vegetable and animal unsaturated fats by saponification such as fatty acids from cotton seed oil, lupine oil, maize oil, colza oil, sesame oil, grape seed oil, walnut oil, perilla oil, linseed oil, wood oil or oiticia, oil, especially soy bean oil, poppy seed oil, sunflower oil or safflower oil. Especially suitable are unsaturated technical fatty acids, especially tall oil. In the range of chemically treated fatty acids or fatty acids of chemically treated oils, fatty acids of de-dehydrated castor oil are especially suitable and although it is possible to employ conjugated and/or elaidinated fatty acids or fatty acids of catalytically conjugated and/or elaidinated fats, e.g. isomerized soy bean oil, safflower and linseed oil fatty acids, they are not preferred in practice. Furthermore, rosin acids, such as colophony or partially hydrated resin acids are suitable as unsaturated acids, as a rule, however, only as additions the fatty acids mentioned up to approximately 50 percent by weight. The fatty acids mentioned may be used alone or mixed with one another.

The adduct formation is effected according to the known methods by heating, the Diels-Alder reaction and the so-called "substituting addition" (H. Wagner, H. F. Sarx "Lackkunstharze" (1959), Karl Hanser Verlag, page 87) being the main reactions. The molar proportion of α,β-unsaturated carboxylic acids to unsaturated fatty acids may vary, and naturally also depend on the type of fatty acids used. The adducts most preferred, however, are those with a proportion between 0.9:1 and 1.1:1.

Adduct formation may also be effected with the oils, i.e. triglycerides. The saponification then takes place subsequently. It is also possible to catalyze the isomerization of the fatty acids during the formation of adducts.

By adding antioxidant agents, the risk of polymerization during the formation of adducts can be reduced. Relatively low viscosity oils are obtained. With additives such as triphenyl phosphite which affect the color favorably, clear adducts can be obtained, even when using raw material of lower quality.

When anhydrides of α,β-unsaturated dicarboxylic acids are used for adduct formation, it is frequently advantageous to hydrolyze these before reaction with the epoxy resin. It is then easier to control the course of the esterification reaction. As a rule, this procedure is only required when a larger number of epoxy groups are still present at the moment of adding the "tricarboxylic acid."

Furthermore, by polybasic carboxylic acids there should also be understood partial esters of polycarboxylic acids which however must still be polybasic carboxylic acids. Especially partial esters of polybasic carboxylic acids with saturated straight chain aliphataic monoalcohols with 1 to 20 carbon atoms come into consideration. Among these, the partial esters of the above described "tricarboxylic acids" not to be defined exactly are especially suitable and are obtained by adduct formation from α,β-unsaturated dicarboxylic acids or their anhydrides and unsaturated fatty acids. Such partial esters may be obtained either:

(a) By reacting α, β-unsaturated dicarboxylic acids or their anhydrides with esters mentioned in the foregoing of unsaturated fatty acids with preferably saturated straight chain aliphatic monoalcohols with 1 to 20 carbon atoms, such as methanol, ethanol, propanol, butanol, pentanol, hexanol and the like, especially methanol, or (b) By partially esterifying the adduct formed with preferably saturated straight chain aliphatic mono alcohols with 1 to 20 carbon atoms such as methanol, ethanol, propanol, butanol, pentanol, hexanol and the like, especially methanol.

The polybasic carboxylic acids obtained according to the methods described under (a) and (b) are not identical. The water-dilutable coating compounds produced with them show different behaviours for example with reference to storability. Their behaviours in the method of the invention also differ, the polybasic carboxylic acids produced according to the method described under (b) requiring somewhat higher esterifying temperature. The polybasic carboxylic acids obtained according to the method described under (b) are preferred.

The production of the partial esters of epoxy groups, possibly compounds containing hydroxyl groups or such polyhydroxyl compounds as have been obtained by hydrolytic decomposition of compounds carrying epoxy groups, is effected with monobasic carboxylic acids by heating and in case reaction water is formed, can be accelerated by adding azeotropic agents removing the reaction water, i.e., xylene, or by working at reduced pressure. It is recommended to remove the dragging agent before the subsequent esterification with the polybasic carboxylic acids. The esterification is preferably continued until the acid number of the partial ester amounts to about zero.

Esterification is simplified by adding basic catalyzers, such as anhydrous sodium carbonate, which accelerate the decomposition of the epoxy group. Resins of a lower viscosity are thereby obtained.

When esterifying polybasic carboxylic acids with epoxy resin partial esters or compounds containing epoxy groups, it should be observed that when mixtures of polybasic carboxylic acids with carboxnyl groups of different reactivity are used, the partial esterification should generally not take place simultaneously, but successively so that the acids with less active carboxyl groups are the first to be partially esterified, usually at a higher temperature, and those with more active carboxyl groups subsequently, usually at lower temperatures. It should proceed correspondingly when anhydrides of polybasic carboxylic acids are brought to reaction.

The esterification is effected at the lowest temperature possible so as to permit good control of the reaction.

The degree of esterification is preferably chosen in such a way that the polybasic carboxylic acid is bonded to the epoxy resin or the polyhydroxyl compound by about one carboxyl group. The small percentage of non-reacted polybasic carboxylic acid possibly remaining in the reaction product is generally of no importance.

The proportion of epoxy groups and eventually compounds carrying hydroxyl groups or such polyhydroxyl compounds as have been obtained by hydrolytic decomposition of compounds carrying epoxy groups, to mono- and polybasic carboxyl acids or eventually their anhydrides or polybasic carboxylic acids alone, may be varied within wide limits. It is, of course, dependent on the types and sizes of molecules of the polybasic carboxyl acids, of the epoxy groups used, and eventually of the compounds carrying hydroxyl groups.

When producing water-dilutable coating compounds by partially esterifying epoxy resins on the basis of bisphenol-A and epichlorhydrin with eventually aliphatic carboxylic acids and adducts of α,β-unsaturated dicarboxylic acids to unsaturated fatty acids, very good resins are obtained when in the initial mixture the proportion of hydroxyl groups (one epoxy group is calculated as two hydroxyl groups, phenolic hydroxyl groups being disregarded) to carboxyl groups (one anhydride group is calculated as two carboxyl groups) falls within the range of 1:0.8 to 1:2. A proportion in the range of 1:1 to 1:1.4 is preferred.

When a very high carboxyl group excess is chosen, so that the epoxy resin is nearly completely esterified, a subsequent partial esterification of the epoxy resin ester with mono and/or polyvalent alcohols may be advantageous. As monovalent alcohols, methanol, ethanol, propanol, isopropanol, butanol, isobutanol, sec-butanol, pentanol, hexanol and the like may be named. As polyvalent alcohols, ethylene glycol, 1,2- and 1,3-propylene glycol, 1,2-, 1,3-, 2,3-, 1,4-butylene glycol, neopentyl glycol, glycerol, trimethylol propane, trimethylol ethane, pentaerythrite and the like may be mention.

The considerable increase of viscosity in the esterification of high molecular epoxy resins and/or epoxy resin partial esters with polybasic carboxylic acids and/or anhydrides may possibly lead to difficulties in the production. When using anhydrides of polybasic carboxylic acids, it is possible to effect the esterification in the presence of such solvents which do not participate in the esterifying reaction. Solvents which are at least partially miscible with water are preferred, such as glycol or diglycol diether, ethylene glycol diethylether, diethylene glycol diethylether or also kentoes, such as methyl isobutyl ketone. Such solvents usually need not be removed as they do not affect the water-dilutability of the resin. When using solvents not miscible with water, these will have to be removed before neutralization.

By choosing the carboxylic acids in suitable proportions, it is possible to control the properties of the resin in relation to elasticity, hardness and corrosion resistance of the lacquer films produced therefrom, but also, e.g., the amount of plastification required when using the electrophoretic lacquering process.

The mixing proportions of the components brought to reaction, e.g., the epoxy compound, the mono and polybasic carboxylic acid or the polybasic carboxylic acid alone, and the degree of esterification of the epoxy compound or the epoxy resin partial ester and of the polybasic carboxylic acid and its anhydrides respectively must be chosen in any case so that resins which are water-soluble or dispersible in water are produced after the neutralization with aqueous ammonia solution or strong organic nitrogen bases.

With low molecular epoxy resins which contain a large number of epoxy groups, the reaction may proceed in such a manner that while the reaction products with polybasic acids are indeed water-soluble after the neutralization, the aqueous solution will still jellify after some time. This property is generally not desired. In order to obtain a sufficient storage stability, the reaction should be prolonged until the number of the existing epoxy groups has become small.

The production method of component II—partial esterification of the epoxy compound with monocarboxylic acids and subsequent reaction with polybasic carboxylic acids to acid epoxy resin esters—has the great advantage that when using unsaturated fatty acids as monocarboxylic acids, the carbon double bonds which are of great importance to form the film are fully conserved.

Formation of the film may be accelerated by adding known catalysts, so-called siccatives.

As the component for the neutralization of the acid esters, aqueous ammonia solutions or strong organic nitrogen bases are suitable alone or in mixtures, such as triethylamine, diethylamine, trimethylamine, piperidine, morpholine, and the like, especially suitable being alkylol amines such as dimethyl ethanolamine, diethanolamine, triethanol amine and especially diisopropanol amine, also polyamines such as ethylene diamine, diethylene triamine and triethylene tetramine which are generally used only in a mixture with monoamines. It is not necessarily required to use the theoretically calculated amount of neutralizing agents for the neutralization. Frequently sufficient water-solubility is already obtained with a smaller amount. Strong volatile tertiary organic nitrogen bases such as triethylamine and dimethyl ethanolamine are preferably used.

The precondensation with relatively low molecular, at least hydrophilic heat-hardenable condensation products such as aminoplast-forming reaction products and/or phenol-resols, results in increased cross linking of the heat-hardened coating materials whereby the technical properties, such as hardness, luster, corrosion resistance, etc., are improved.

By heat-hardened are also to be understood those condensation products which when merely heated will acquire a relatively high molecular weight but without having become infusible. It is also not absolutely necessary that the condensation products which have been produced by the precondensation must themselves be water-soluble. It is only necessary for them to be sufficiently hydrophilic after the precondensation to be rendered compatible with the plasticizing components and with the neutralizing and dilution components, which means that clear lacquers which have been heat-hardened must be homogeneous and that there must not have been any separation of binder components from the aqueous coating materials while they are at their required concentrations.

The combination of the epoxide-resin partial esters with etherified phenol-resols or aminoplast-forming condensation products by reacting them during heating has the advantage of increasing the storage stability of the aqueous coating materials, and also of increasing the resistance of the heat-hardened films to corrosion.

Thermosetting, hydrophilic, low molecular condensation products forming aminoplasts are also aldehyde reaction products of compounds reactable with aldehydes such as urea, ethylene urea, dicyanide diamine and aminotriazine such as melamine, benzguanamine, acetguanamine and formguanamine. The above-mentioned compounds can be reacted with aldehyde, such as formaldehyde, acetaldehyde, crotonaldehyde, acroleine, benzaldehyde, furfural and the like. By aldehydes should also be understood aldehyde-forming compounds such as paraformaldehyde, paraaldehyde and trioxymethylene. A preferred aldehyde is formaldehyde. The preferred aldehyde neutralizing compounds are melamine and urea. The reaction is effected in the usual molar proportions, i.e., with urea resins in a usual formaldehyde molar proportion of 1:1.5 to 1:4, with melamine resins in a formaldehyde molar proportion of 1:1.5 to 1:6. The nitrogen containing polyalcohols are preferably applied in partially or completely alkyled or alcohol modified form.

The esterifying products of the lowest semi-ethers of glycol and diglycol, such as ethylene glycol, ethylene diglycol with the methylol melamines which have already been disclosed in the Austrian patent specification 180,-407 have also proved advantageous in the present case.

Preference is also given to low molecular condensation products of melamine with formaldehyde with a melamine formaldehyde proportion of 1:4 to 1:6, which has been etherified methanol. Also suitable are ethers of polymethylol compounds containing nitrogen partially esterified with dicarboxylic acids, such as are obtained e.g. by alcoholysis of hexamethoxymethyl melamine with adipic acid. Such condensation products may be contained in the baking varnish of this invention in amounts of 5 to 50 weight percent.

The percentages given refer to solid contents. A combination of all the components with the aminoplast condensation products is preferred wherein the aminoplast condensation products are 5 to 25 percent by weight.

As phenol-resols for the etherification, use can be made for example of the phenol-resol to be mentioned later and of the pehnol-carboxylic acid resols, preferably p.tert.-butyl-phenyl resols. The degree of etherification and the proportion of etherified phenol-resols in the coating material of this invention is predetermined in such a manner that homogeneous films are produced after heat-hardening. The relative amounts of epoxide-resin-partial-ester and heat-hardenable condensation products, especially with etherified phenol-resols, are in the range of from 1 to 50% by weight, the preferred range being from 5 to 35%, based in each case on the amount of solid resin.

Examples of suitable thermosetting hydrophilic, low molecular condensation products are phenol alcohols and phenol polyalcohols, i.e. still low molecular by condensation of mono and/or polynuclear phenols with aldehydes, such as formaldehyde, acetaldehyde, crotonaldehyde, acroleine, benzaldehyde, furfural and the like, or formaldehyde supplying compounds, such as paraformaldehyde, paraldehyde, trioxymethylene—the preferred aldehyde being formaldehyde or a formaldehyde supplying compound—which are obtained in the known way in the alcaline medium. As phenols the following are suitable: phenols, phenols substituted in o-, o'- and p-position but still condensable with formaldehyde, such as cresol, xylenol. Especially well suitable are resols obtained from alkyl phenols, such as propyl, butyl and especially p-tert.-butyl-phenol. Furthermore resols of binuclear phenols such as diphenol, bisphenol-A are suitable, especially when approximately 1.75 to 2.5 moles formaldehyde have been added per mole of pehnol. When applying the resols, it is recommended to also use a small amount of a strongly hydrophilic solvent, such as ethylglycol, diethylglycol, propylglycol, isopropylglycol, butylglycol.

Resols of phenol carboxylic acids are preferably used, which are obtained by condensation of formaldehyde or formaldehyde supplying compounds with suitable phenol carboxylic acids. Among the phenol carboxylic acids condensable with formaldehyde, the 4,4-bis-(4-hydroxyphenyl)-valeric acid occupies a preferred position. Here too, the most advantageous results are obained when 1.75 to 2.5 moles formaldehyde are combined per mole of diphenol acid. It is recommended to neutralize the phenol carboxylic acid resols preferably with ammonia before mixing with the plasticizing component respectively. The production of other suitable phenol carboxylic acid resols is described, e.g. in the German document laid open to public inspection No. 1,113,775. Phenol carboxylic acid resols, especially those based on the 4,4-bis-(4-hydroxyphenyl)-valeric acid, are eminently suitable for the combination according to the invention, which are destined for the application according to the invention as electrophoretically precipitable coatings and lacquer binders. In the coatings and lacquer binders according to the invention, the percentage of hydrophilic phenol resols and/or phenol carboxylic acid resols can amount to from 1 to 50 weight percent, those combinations being preferred which contain 5 to 25 weight percent of the phenol resols and/or phenol carboxylic acid resols.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

All parts (T) relate to parts by weight.

Example of the manufacture of p.tert.-butylresol I

60 T of p.tert.-butylphenol and 80 T of aqueous formaldehyde solution (30% strength) are allowed to react with one another at about 40° C. under the influence of strong caustic alkalis, in a known manner, until the content of free formaldehyde has fallen to practically zero. The resol is decomposed with the aid of strong acids and is washed with water until free of salt.

Manufacture of the etherified phenolic-resol 2

500 T. of p.tert.-butylresol I, as already described, are mixed with such quantities of methanol that the water content of the reaction mixture is not more than 20%, relative to methanol. The mixture is then adjusted to a pH value of about 2–1 with sulfuric acid and warmed to 60° C. for about 2 to 3 hours. The solids content of a neutralized sample rises by about 2 to 3%. The batch is then neutralized with sodium hydroxide solution and methanol and water are distilled off in vacuo, during which a temperature of 60° C. should not be exceeded. The reaction mixture is twice washed with distilled water in order to remove the salts. The solids content is about 75% after removal of the wash water.

Manufacture of the butanol etherified phenolic-resol 3

6865 parts p.tert.-butyl-resol, as already described, are dehydrated under vacuum up to 90° C. 1650 g. n-butanol and 835 g. toluene are then added. The mixture is heated to boiling and the water is removed by azeotropic distillation, whereby the solvent mixture is returned to the reaction vessel. After 40 g. of water have been removed, 8 g. of 85% phosphoric acid are added and the azeotropic distillation continued until no more water passes over. The acid is then neutralized with calcium hydroxide. The product is concentrated under vacuum to a temperature of 110° C. and is then filtered. The solids content amounts to about 92%.

Manufacture of fatty acid adduct A

300 T of dehydrated castor oil fatty acids and 450 T of tall oil fatty acids containing not more than 1.5% of resin and about 1% of unsaponifiable matter are reacted with 250 T of maleic anhydride at 180 to 200° C. in a known manner, until the free maleic anhydride content has fallen to below 1% of the amount employed. After completion of adduct formation the mixture is cooled to 80° C., and the anhydride is hydrolyzed with 45 T of water by keeping at 100° C. for 2 hours.

Manufacture of epoxide resin partial ester 1

705 T of the fatty acid adduct A are mixed with 640 T of an epoxide resin having an epoxide equivalent weight of 230 to 280, a refractive index of 1.5830 and a viscosity of 500 to 1000 cp./25° C., measured at 70% strength in butyldiglycol, which was obtained in a known manner by alkaline condensation of bisphenol A with epichlorhydrin or dichlorhydrin, and reacted under an inert gas at a temperature of between 100 and 130° C. until the viscosity has risen to about 250 cp./20° C., measured at 50% strength in butylglycol.

Example 1 according to the invention

600 T of the epoxide partial ester 1 are mixed with 426 T of butylphenol-resol 1 (solids content 76%), heated to about 100° C. under an inert gas, and this temperature maintained until the viscosity is about 250 cp./20° C., measured at 50% strength in butylglycol. The resin is diluted with 20% butylglycol and neutralized with diisopropanolamine in the presence of water until the pH value of a 10% strength solution is 8.1.

This solution, when diluted with deionized water to approximately 10% solids content represents, either unpigmented or ground with suitable pigments and fillers, a suitable bath solution for the electrophoretic lacquering process.

Example 2 according to the invention

600 T of the epoxide resin partial ester 1 are mixed with 416 T of etherified phenolic-resol 2 (solids content 78%) under an inert gas and kept at a temperature of between 100 and 110° C. until the viscosity has risen to about 250 cp./20° C., measured at 50% strength in butylglycol. At the same time the acid number should have fallen below 100. The resin is diluted with about 20% of butylglycol and neutralized with dimethylethanolamine in the presence of water until the pH value of a 10% strength aqueous solution is about 8. This resin is also suitable for use as a binder for the electrophoretic lacquering process.

Example 3 according to the invention

433 T of butylphenol-resol 1 (solids content 75.2%), and 285 T of an epoxide resin with an epoxide equivalent weight of 230 to 280, a refractive index of 1.5830 and a viscosity of 500 to 1000 cp./20° C., measured at 70% strength in butylglycol, which had been obtained in a known manner by alkaline condensation of bisphenol A with epichlorhydrin are reacted with one another under an inert gas at about 90 to 110° C. until the viscosity of the resin measured at 50% strength is butylglycol has risen to about 120 cp./20° C. The condensation is appropriately carried out in vacuo in order to remove excess water from the reaction mixture.

630 T of his condensation product are mixed with 285 T of fatty acid adduct A and reacted with one another at 100 to 105° C. until the viscosity, measured at 50% strength in butylglycol, has reached about 250 cp./20° C. The resin is diluted with about 25% ethylglycol and is neutralized with dimethylethanolamine in the presence of water.

This product is also suitable for use as a binder for lacquers which may be deposited electrophoretically. As a rule products of somewhat higher film resistance are obtained by this method. The lacquers which may be deposited electrophoretically are manufactured in the manner described in the main patent.

Example 4 according to the invention 310 parts butyl-phenol-resol 3 which has been etherified with butanol (solids content 92%) and 222 parts of an epoxide resin with an epoxide equivalent weight of 230–280, an index of refraction of 1.5830 and a viscosity of 500–1000 cp./25° C. measured at 70% in butyl glycol, which was obtained in a known manner by alkaline condensation of bisphenol A with epichlorhydrin are reacted 2 hours with each other under an inert gas at 130° C. The viscosity is then 1200 cp./20° C. 222 g. fatty acid adduct A are then added and the mixture is heated to 130° C. until the viscosity in 50% butylglycol reaches about 200 cp./20° C. and the acid number reaches 60–64. The resin is diluted with about 25% of ethylglycol and is neutralized with diethanolamine in the presence of water. The product is suitable for use as a binding material for elechrophoretically separable lacquers and when in an electrophoresis bath is characterized by its excellent stability. The acqueous coating materials of Examples 1–4, which can be pigmented or unpigmented or mixed with other fillers, produce after being heat-hardened 30–20 minutes at 150–190° C., very durable coatings. The coating materials are especially suitable for the preparation of solutions for electrophoretic application in Examples 1–4. Such a solution can be prepared as follows:

10 kg. of a 40% solution of the resin of Examples 1–4 are comminuted in a ball mill with 2 kg. red iron oxide and then diluted with distilled water to a solids content of 20–10%. For electrophoretic application the metal body is immersed as an anode in the bath. After application of a D.C. potential of about 100 volts the body becomes uniformly coated with the coating material of this invention. By the addition of limited amounts of suitable organic solvents that are miscible in water, e.g. ethylglycol or butylglycol, the coating can be increased in thickness. After heating the coating to 170–190° C. 30–20 minutes, a very corrosion-resistant coating is obtained.

Example 5 according to the invention 195 hexamethoxy-methyl-melamine and 250 g. of an epoxide resin with an epoxide equivalent weight of from 230 to 280, an index of refraction of 1.5830 and a viscosity of 500 to 1000 cp. at 20° C. with 70% in butylglycol (the epoxide resin having been obtained in a known manner by alkaline condensation of bisphenol A with epichlorhydrin), are mixed with each other. To the mixture is then added 2 g. of a 50% solution of benzyltrimethylammonium hydroxide in methanol. The mixture is kept 2 hours under inert gas at 130° C., whereupon the viscosity reaches 115 cp. at 20° C. with a 2:1 concentration in butylglycol. To this solution 260 g. fatty acid adduct A are added and the mixture is heated to 120 to 130° C. until the viscosity reaches 260 cp. with 50% in butylglycol at 20° C., and the acid number has reached a value of 73. The resin is diluted with about 25% ethylglycol and is neutralized with diethanolamine in the presence of water. The product is suitable for use as a binder for electrophoretically separable lacquers and is characterized by the low temperature of 150° C. at which it can be hardened.

Without further elaboration, it is beileved that one skilled in the art can, using the preceding description, utilize the present invention to its fullest extent. The aforesaid preferred specific embodiments are, therefore, to be construed as merely illustrative, and not limitative of the remainder of the specification and claims in any way whatsoever.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:
1. A method for preparing water-dilutable, heat-curable coating compositions comprising:
(I) precondensing by heating at a temperature less than 160° C. about 99 to 50 percent by weight of compounds containing epoxy groups or hydroxyl groups consisting of epoxy resins of the general formula:

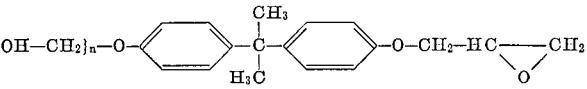

having molecular weights of between about 380 and 3500 with about 1 to 50 percent by weight of heat-curable, water-dilutable low molecular weight condensation products selected from the group consisting of phenoplast resins, aminoplast resins and mixtures of phenoplast resins and aminoplast resins;
(II) reacting for a time sufficient to produce an acid number of about 60–100 the precondensate of step I at a temperature less than 160° C. with adducts selected from the group consisting of maleic acid with fatty acids and maleic anhydride with fatty acids, said fatty acids selected from the group consisting of drying oil acids, semi-drying oil acids, and mixtures of said oil acids with rosin acids, the molar proportion of fatty acid to maleic acid or maleic anhydride being between about 0.9:1 and 1.1:1 wherein the proportion of hydroxyl groups in the precondensate of step I to carboxyl groups of said adducts is about 1:0.8 to 1:2 and wherein one epoxy group is calculated as two hydroxyl groups and one anhydride group is calculated as two carboxyl groups to form epoxy resin partial esters;
(III) neutralizing the product of step II with a basic material selected from the group consisting of ammonia and strong organic nitrogen bases; and
(IV) diluting the neutralized product with water.

2. The method of claim 1, wherein the amount of condensation products is about 5 to 35 percent by weight based on the solids content of the product of step II.

3. The method of claim 1, wherein steps (I) and (II) are carried out at temperatures between 80 and 160° C.

4. The method of claim 1, wherein said fatty acids are selected from the group consisting of dehydrated castor oil fatty acids, tall oil fatty acids and mixtures thereof.

5. The method of claim 1, further comprising adding catalysts to accelerate film drying.

6. The method of claim 1, wherein said phenoplast resins are the condensation products of formaldehyde and a compound selected from the group consisting of phenols and 4,4-bis-(4-hydroxyphenol)valeric acid.

7. The method of claim 1, wherein said aminoplast resins are formaldehyde condensation products of low molecular methanol etherified polymethanol melamine having 4–6 moles of formaldehyde per mole of melamine.

8. The method of claim 1, wherein said strong organic nitrogen bases are selected from the group consisting of triethylamine and diethyl-ethanol-amine.

9. The method of claim 1, wherein the molar proportion of hydroxyl groups in the precondensate of Group I to carboxyl groups of said adducts is about 1:1 to 1:1.4.

10. The method of claim 1, wherein said precondensation is performed under a vacuum.

11. The method of claim 1, wherein said phenoplast resins are the condensation products of formaldehyde with phenols with the general formula

in which R means an alkyl residue having 2 to 20, and preferably 4 carbon atoms or aryl residue.

12. The method of claim 11, wherein said product is etherified with aliphatic monoalcohols having 1 to 6 carbon atoms.

13. The product obtained by the process of claim 1.

References Cited

UNITED STATES PATENTS

| | | | |
|---|---|---|---|
| 3,450,660 | 6/1969 | Sekmakas et al. | 260—29.4 |
| 3,444,114 | 5/1969 | Downing | 260—21 |
| 3,410,926 | 11/1968 | Hicks | 260—21X |
| 3,355,401 | 11/1967 | Tanner | 260—18 |
| 3,308,077 | 3/1967 | Pattison et al. | 260—23 |
| 3,305,501 | 2/1967 | Spalding | 260—18 |
| 3,133,032 | 5/1964 | Jen et al. | 260—29.4 |
| 2,915,486 | 12/1959 | Shelley | 260—21 |
| 2,681,894 | 6/1954 | Hoenel | 260—20 |
| 3,196,117 | 7/1965 | Boller | 260—19X |

DONALD E. CZAJA, Primary Examiner

C. W. IVY, Assistant Examiner

U.S. Cl. X.R.

204—181; 260—20, 21, 29.3, 29.4, 37

Notice of Adverse Decision in Interference

In Interference No. 98,143 involving Patent No. 3,567,668, R. Guldenpfenning, METHOD FOR PREPARING AND COMPOSITIONS OF EPOXY RESIN ESTERS PRECONDENSED WITH PHENOPLASTIC OR AMINOPLASTIC RESINS, final judgment adverse to the patentee was rendered Nov. 27, 1973, as to claims 1, 4 and 13.

[*Official Gazette February 26, 1974.*]